United States Patent
Shahmoon et al.

(10) Patent No.: US 9,078,090 B1
(45) Date of Patent: Jul. 7, 2015

(54) METHOD AND APPARATUS FOR ENVIRONMENT BASED COMMUNICATION CONTROL

(75) Inventors: Hezi Shahmoon, Kiryat Ono (IL); Shimeon Greenberg, Yavne (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 861 days.

(21) Appl. No.: 12/986,569

(22) Filed: Jan. 7, 2011

Related U.S. Application Data

(60) Provisional application No. 61/294,003, filed on Jan. 11, 2010, provisional application No. 61/419,187, filed on Dec. 2, 2010.

(51) Int. Cl.
*H04W 24/00* (2009.01)
*H04W 4/02* (2009.01)

(52) U.S. Cl.
CPC ............... *H04W 4/02* (2013.01); *H04W 4/026* (2013.01); *H04W 4/027* (2013.01)

(58) Field of Classification Search
CPC ........ H04W 4/02; H04W 4/026; H04W 4/027
USPC .................................. 455/456.3, 456.1, 556.1
See application file for complete search history.

(56) References Cited

U.S. PATENT DOCUMENTS

| | | | |
|---|---|---|---|
| 7,826,425 B2 * | 11/2010 | Sekhar | 370/331 |
| 8,005,512 B2 * | 8/2011 | Bengtsson | 455/566 |
| 8,417,296 B2 * | 4/2013 | Caballero et al. | 455/566 |
| 2006/0240866 A1 * | 10/2006 | Eilts | 455/556.1 |
| 2008/0165737 A1 * | 7/2008 | Uppala | 370/331 |
| 2009/0122763 A1 * | 5/2009 | Oguchi | 370/331 |
| 2010/0075639 A1 * | 3/2010 | Horvitz et al. | 455/412.2 |

* cited by examiner

*Primary Examiner* — Raymond Dean

(57) ABSTRACT

Aspects of the disclosure provide a method for controlling user equipment (UE) to improve user experience. The method includes sensing an environmental condition using a sensor associated with the UE, and governing a communication functionality of the UE based on the sensed environmental condition.

20 Claims, 4 Drawing Sheets

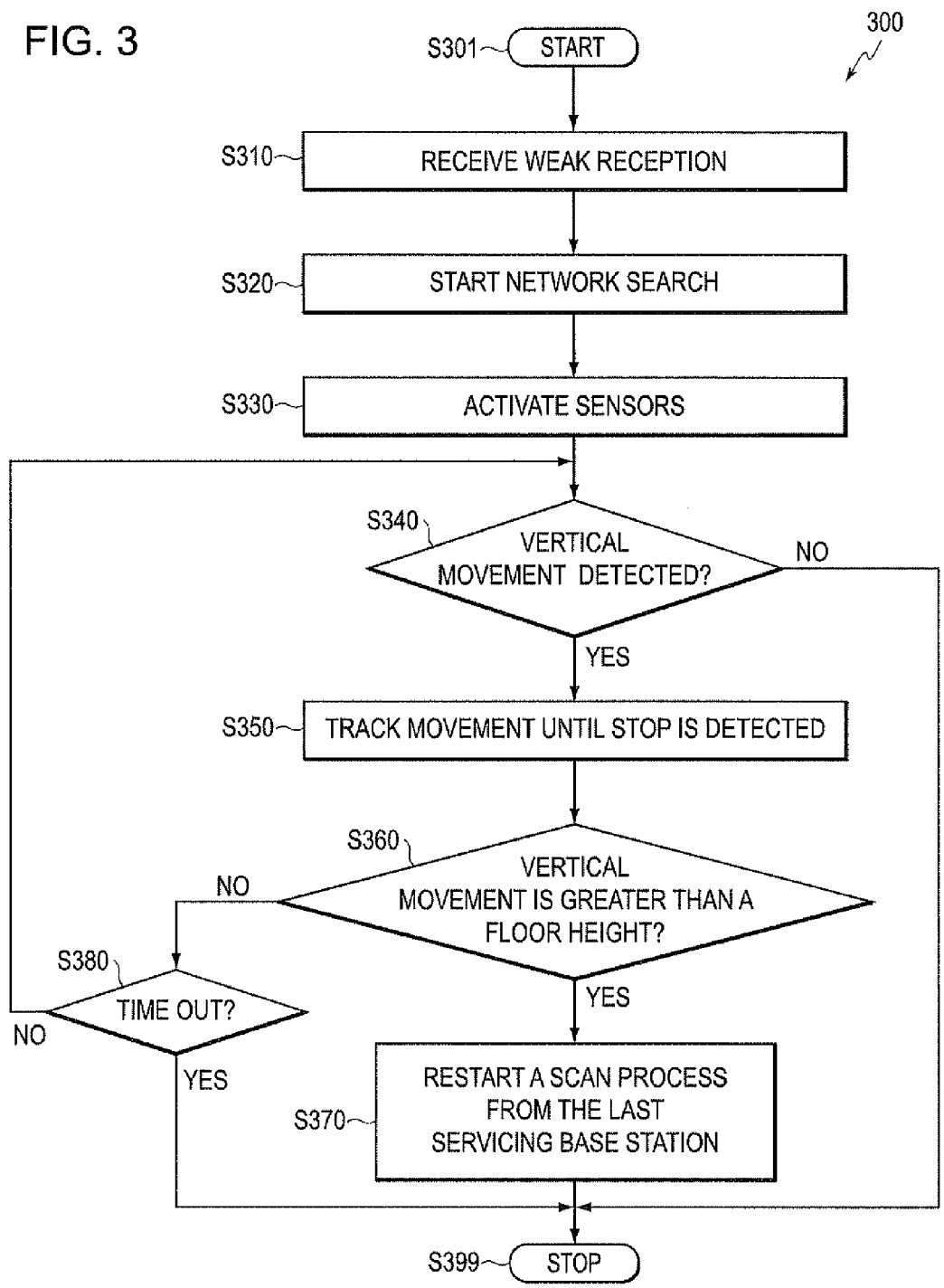

METHOD AND APPARATUS FOR ENVIRONMENT BASED COMMUNICATION CONTROL

INCORPORATION BY REFERENCE

This application claims the benefit of U.S. Provisional Applications No. 61/294,003, "Elevator Environment Detector" filed on Jan. 11, 2010, and No. 61/419,187, "Controlling Communication System Using Application Sensor Inputs" filed on Dec. 2, 2010, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, cellular networks include numerous base stations and numerous user equipment (UE) devices, each of which devices communicates at any given time with one or more of the base stations. A pairing between a UE and a base station is periodically evaluated for quality of a communication link, and the pairing is occasionally changed.

SUMMARY

Aspects of the disclosure provide a method for controlling user equipment (UE) to improve user experience. The method includes sensing an environmental condition using a sensor associated with the UE, and governing a communication functionality of the UE based on the sensed environmental condition.

In an embodiment, the method includes sensing a proximity to a human appendage, and controlling a radiation characteristic of the UE for communication based on the sensed proximity. To control the radiation characteristic, in an example, the method includes adjusting respective transmission power of multiple antennas to direct transmission away from a human head when the UE is sensed in a proximity of the human head. In another example, the method includes reducing a radiation power when the UE is sensed in the proximity of the human head.

According to an aspect of the disclosure, to sense the environmental condition, the method includes sensing a motion dynamic of the UE. Further, in an example, to govern the communication functionality, the method includes at least one of governing a receiving algorithm based on the sensed motion dynamic, governing a protocol stack operation of the UE based on the sensed motion dynamic, and governing a scan process to search for a servicing base station based on the sensed motion dynamic.

In an embodiment, the method further includes re-establishing a communication service with a last servicing base station based on the sensed environmental condition.

In an example, the method includes sensing an elevation dynamic of the UE using a gravimeter, and storing the last servicing base station when the sensed elevation dynamic is indicative of the UE being in an elevator. For example, the method includes activating the gravimeter when the UE loses reception from the last servicing base station.

To re-establish the communication service with the last servicing base station based on the senses environmental condition, in an example, the method includes re-establishing the communication service with the last servicing base station when the sensed elevation dynamic is indicative of the UE being out of the elevator. In another example, the method includes re-establishing the communication service with the last servicing base station when received signal strength exceeds a threshold.

Aspects of the disclosure also provide user equipment (UE) that has improved user experience. The UE includes an environmental sensor module configured to sense an environmental condition of the UE, a wireless communication module configured to perform wireless communication, and a communication controller configured to govern operations of the wireless communication module based on the sensed environmental condition input from the environmental sensor module.

BRIEF DESCRIPTION OF THE DRAWINGS

Various embodiments of this disclosure that are proposed as examples will be described in detail with reference to the following figures, wherein like numerals reference like elements, and wherein:

FIG. 3 shows a flow chart outlining a process example 300 for governing communication operations based on a sensed environmental condition according to an embodiment of the disclosure.

DETAILED DESCRIPTION OF EMBODIMENTS

Figure 1:
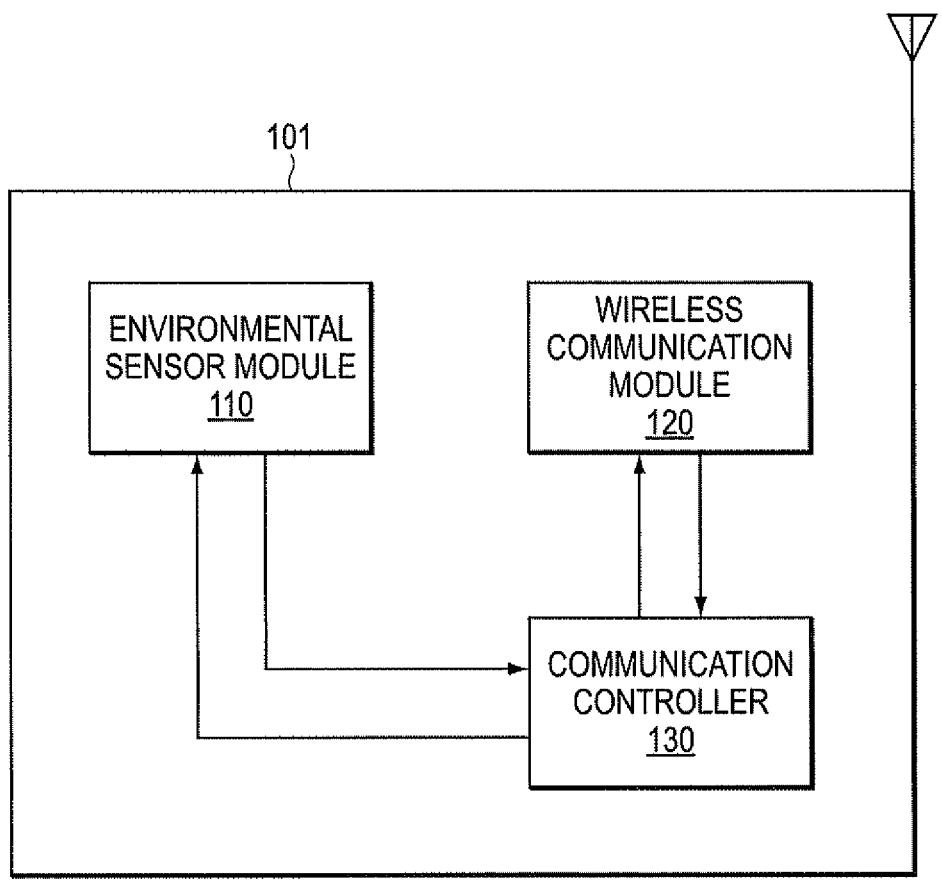
FIG. 1 shows a block diagram of user equipment (UE) 101 according to an embodiment of the disclosure.

FIG. 1 shows a block diagram of user equipment (UE) 101 according to an embodiment of the disclosure. The UE 101 includes an environmental sensor module 110, a wireless communication module 120, and a communication controller 130. The communication controller 130 is configured to control operations of the wireless communication module 120 based on inputs from the environmental sensor module 110. In an embodiment, these elements are coupled together as shown in FIG. 1.

The UE 101 can be any suitable user equipment, such as a mobile phone, a personal data assistant, a handheld device, a laptop computer, a camera, a printer, a media device, and the like. According to an embodiment of the disclosure, the UE 101 is configured to communicate with an access point in a communication network, such as a base station in a cellular telephony network, and the like, to perform mobile communication.

The wireless communication module 120 receives signals from the air, and processes the received signals. In addition, the wireless communication module 120 prepares signals for transmission, and transmits the prepared signals into the air. The wireless communication module 120 includes various suitable hardware components and software components.

For example, the wireless communication module 120 includes a receiving path (not shown). In an embodiment, the receiving path includes a front-end analog portion that processes the received signals using analog techniques, an analog to digital converter (ADC) that converts the processed signals from analog form to digital form, and digital circuits that process the converted signals using digital techniques. In an example, the front-end analog portion includes a signal quality measurement circuit that measures a signal quality, such as a signal strength of a received signal.

The wireless communication module 120 also includes a transmission path (not shown). In an embodiment, the transmission path includes digital circuits to process signals for transmission using digital techniques, a digital to analog converter (DAC) that converts the processed signals from digital form to analog form, and analog circuits that prepare the converted signals for transmission using analog techniques. In an example, the analog circuits include a power amplifier that can be used to adjust signal transmission power.

Further, the wireless communication module 120 includes software components, such as communication protocols, scan algorithms, and the like, that are in the form of instruction codes stored in a computer readable medium. The instruction codes can be executed by a processor to perform operations on the received signals, and generate signals for transmission.

According to an aspect of the disclosure, the wireless communication module 120 is configured to perform a full scan process or a partial scan process to search for a suitable servicing base station, for example when a quality of a communication link between the UE 101 and a base station falls below a communication link threshold. In an example, the wireless communication module 120 tunes its synchronization to every possible communication link to receive a signal sent by a base station, measure a signal quality, and determines whether the base station is suitable for a servicing base station based on the signal quality.

In another example, the wireless communication module 120 includes a list of a subset of base stations, such as neighbor base stations, various available modes with the base stations, and the like. The wireless communication module 120 respectively tunes its synchronization to each neighbor base station on the list, receives a signal to measure a signal quality, and determines whether the neighbor base station is suitable for a servicing base station based on the signal quality.

In another example, the wireless communication module 120 receives instructions, for example, from the communication controller 130, to start scanning from a specific base station. The wireless communication module 120 tunes its synchronization to the specific base station to receive a signal, measures a signal quality, and determines whether the specific base station is suitable for a servicing base station based on the signal quality.

According to another aspect of the disclosure, the wireless communication module 120 is able to adjust radiation characteristic for transmission. In an example, the wireless communication module 120 controls the power amplifier to adjust transmission power. In another example, the wireless communication module 120 includes multiple antennas for transmission. The wireless communication module 120 can adjust respective transmission power of the multiple antennas, such that the collective transmission by the multiple antennas has a desired radiation pattern. In another example, the multiple antennas have spatial and/or directional difference, and the wireless communication module 120 selects suitable antennas for transmission. For example, the wireless communication module 120 selects a directional antenna having a desired transmission direction.

According to another aspect of the disclosure, the wireless communication module 120 is able to operate according to different wireless communication standards, such as code division multiple access (CDMA), wideband CDMA, long term evolution (LTE), advanced version of LTE (LTE-A), global system for mobile (GSM), WiFi, and the like. The wireless communication module 120 selects a standard, and communicates according to the standard.

According to another aspect of the disclosure, the wireless communication module 120 is implemented by a layered architecture, such as a protocol stack, to provide various communication services and to suitably respond to various events. The protocol stack includes various layers. Each layer is configured to perform a portion of the communication services, and is configured to communication with adjacent layers. The operation of the protocol stack, and the operations of the layers can be suitably controlled.

The environmental sensor module 110 senses suitable environmental parameters. It is noted that the environmental sensor module 110 can include various sensors to sense various parameters in the environment. The environmental condition is determined based on sensed values from one or more sensors.

In an embodiment, the environmental sensor module 110 includes gravimeter (G-sensor) that uses a miniature accelerometer to sense a gravitational field. The gravitational field can be used to detect motion dynamics of the UE 101 in a vertical direction. In an example, the G-sensor senses a gravitational field, and compensates the gravitational field to detect a vertical acceleration of the UE 101, for example, in an elevator. An integral of the vertical acceleration over time is indicative a vertical velocity of the UE 101. Further, an integral of the vertical velocity provides a vertical distance traveled by the UE 101.

It is noted that the environmental sensor module 110 can include other suitable accelerometer that senses acceleration in other directions.

In another embodiment, the environmental sensor module 110 includes a compass that senses a magnetic field. In an example, the compass provides directional information of the UE 101. In another embodiment, the environmental sensor module 110 includes a Gyro-sensor that senses spatial movement, such as rotation, and the like. In an example, the Gyro-sensor provides a rotation vector that is indicative of rotation of the UE 101.

In another embodiment, the environmental sensor module 110 includes a global position system (GPS) that provides location and velocity information. In another embodiment, the environmental sensor module 110 includes a humidity sensor that provides humidity in the environment. In another embodiment, the environmental sensor module 110 includes a surrounding temperature sensor that provides an external temperature. In another embodiment, the environmental sensor module 110 includes a barometric sensor that provides pressure and altitude measurement. In another embodiment, the environmental sensor module 110 includes a radar that detects a surrounding metal structure.

It is noted that the environmental sensor module 110 can include other suitable sensors, such as proximity sensor, video sensor, optical sensor, and the like.

The communication controller 130 receives inputs from the environmental sensor module 110, and determines one or more environmental conditions based on the inputs. Based on the environmental conditions, the communication controller 130 controls operations of the wireless communication module 120.

In an embodiment, the communication controller 130 provides the environmental information to the protocol stack to govern the operation of the protocol stack. The protocol stack delivers the environmental information to suitable layers, causes the suitable layers of the wireless communication module 120 to suitably respond to the environmental information. For example, the layers suitably adjust communication services based on the environmental information. In an example, an LTE stack includes an L3 layer of radio resource control (RRC) protocol that performs signal strength measurement, cell reselection, handover, security, integrity services, and the like. The L3 layer may perform differently according to the environmental information. In an example, when the environmental information indicates that the UE 101 is in an elevator, the L3 layer holds on cell reselection and handover services in response to relatively low received signal strength, until the UE 101 exits the elevator. However, when the environmental information indicates that the UE 101 is in an open area, the L3 layer performs cell reselection and handover services in response to relatively low received signal strength.

In another embodiment, the communication controller 130 receives inputs from the environmental sensor 110 to determine a proximity of the UE 101 to a human appendage, such as a human hand, a human head, and the like. Further, the communication controller 130 controls the operation of the wireless communication module 120 based on the determined proximity of the UE 101. In an example, the communication controller 130 determines that the UE 101 is in a proximity of a user's head when the user puts the UE 101 near his ear to listen to an internal speaker of the UE 101. The communication controller 130 controls the wireless communication module 120 to adjust radiation characteristics, such as adjusting respective transmission power of multiple antennas, selecting an antenna with a directional radiation pattern, reducing transmission power, and the like, to minimize radiation to the user. It is noted that, in an embodiment, by adjusting radiation characteristics, the UE 101 is controlled so as to emit radiation in a pattern that is less detrimental to the user, although this comes at a cost of a sub-optical, but nevertheless acceptable, communication link with the base station.

In another embodiment, the communication controller 130 receives inputs from the environmental sensor module 110 to determine that the UE 101 is in a metal structure that acts similarly to a Faraday's cage. The communication controller 130 controls the wireless communication module 120 to enter a power saving mode to save energy until the UE 101 exits the metal structure.

In another embodiment, the communication controller 130 receives inputs from the surrounding temperature sensor. Based on the surrounding temperature, the communication controller 130 controls the wireless communication module 120 to adjust the transmission power. For example, when the surrounding temperature is higher than a threshold, the communication controller 130 controls the wireless communication module 120 to increase the transmission power.

The communication controller 130 can be implemented by various techniques. In an example, the communication controller 130 is implemented as logic circuits. In another example, the communication controller 130 is implemented as instruction codes stored in a computer readable medium. The instruction codes are executed by a processor to perform the control operations.

Figure 2A:
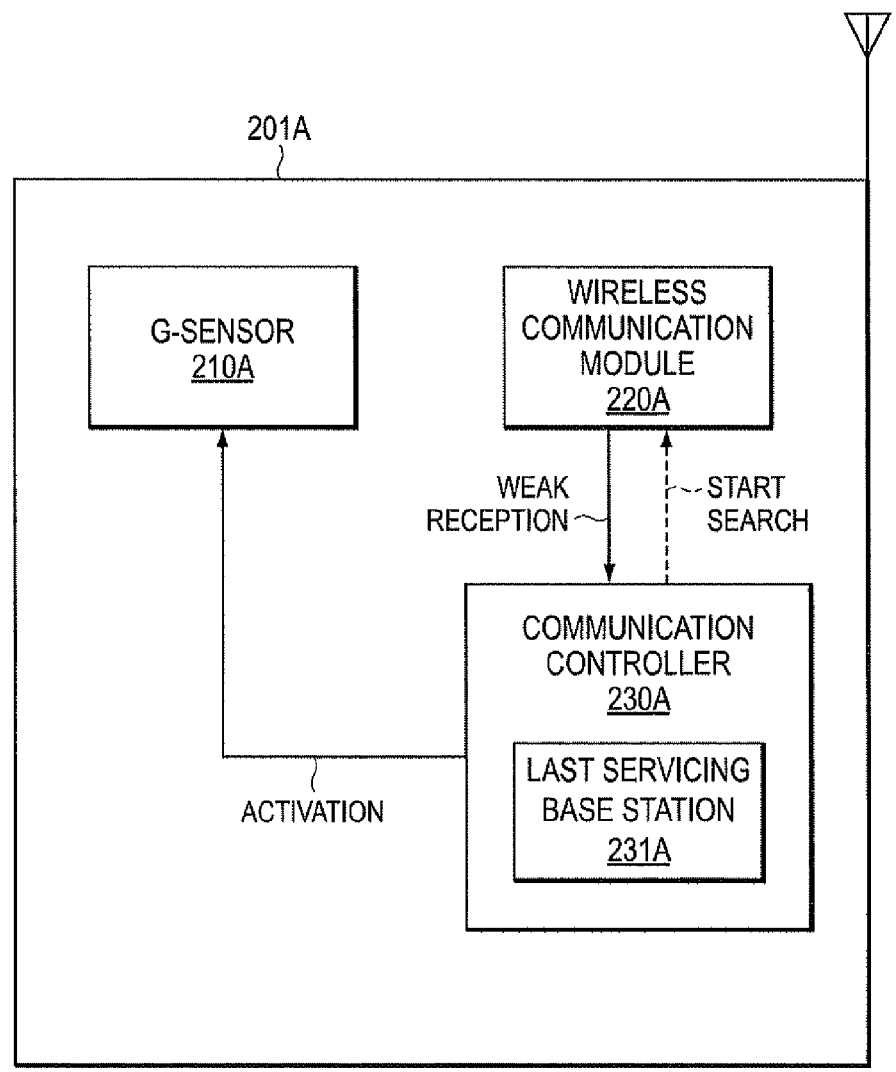
FIGS. 2A and 2B show block diagrams of a mobile phone 201 during operation according to an embodiment of the disclosure.
Figure 2B:
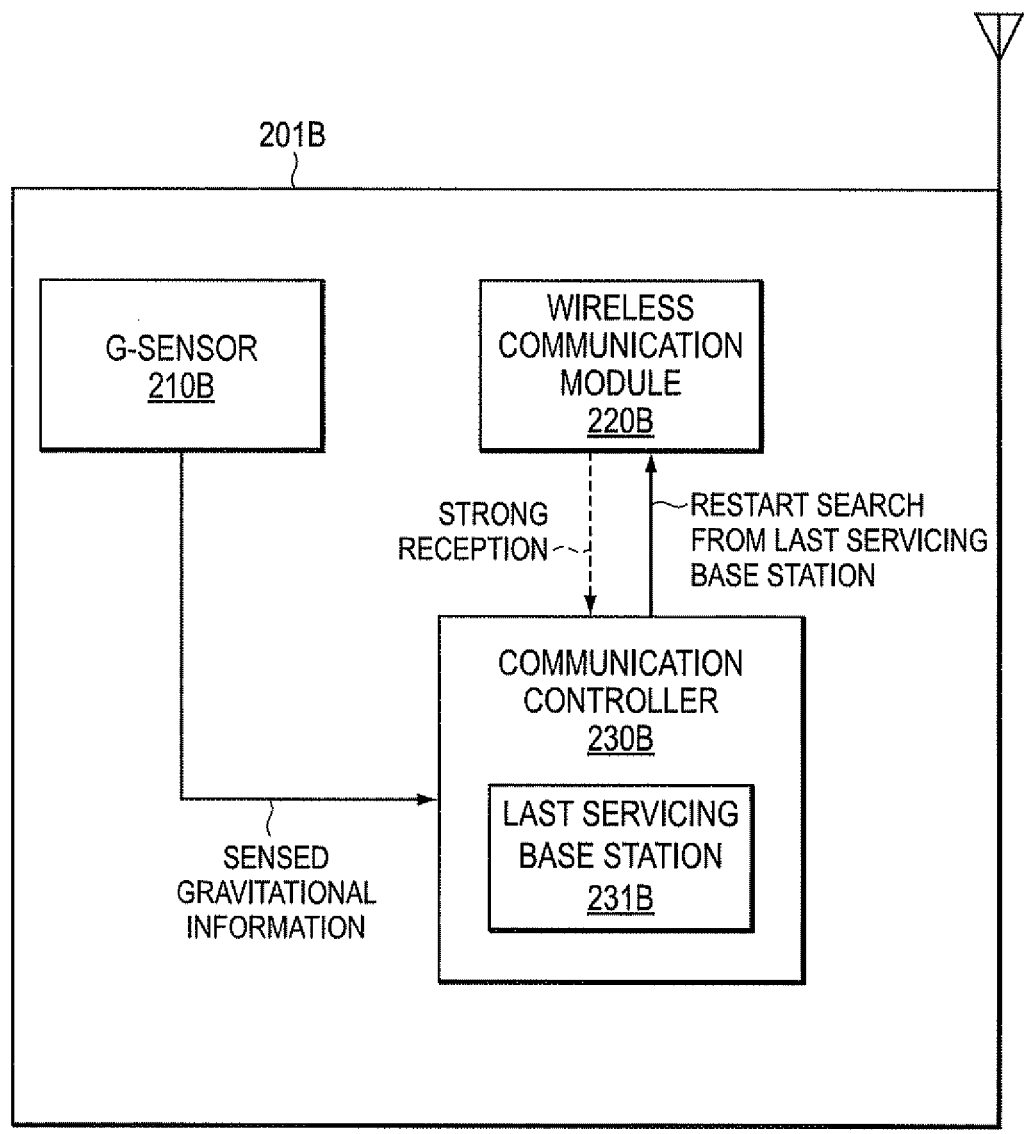

FIGS. 2A and 2B show simplified block diagrams of a mobile phone 201 (201A in FIG. 2A and 201B in FIG. 2B) during operation according to an embodiment of the disclosure. The mobile phone 201 includes a G-sensor 210 (210A in FIG. 2A and 210B in FIG. 2B), a wireless communication module 220 (220A in FIG. 2A and 220B in FIG. 2B), and a communication controller 230 (230A in FIG. 2A and 230B in FIG. 2B). In an embodiment, the communication controller 230 includes a memory 231 (231A in FIG. 2A and 231B in FIG. 2B).

In the embodiment, the mobile phone 201 is configured to perform telecommunication via a servicing base station. In an example, initially, the wireless communication module 220 performs a scan process to search for a base station as its servicing base station to receive service. Further, periodically, the wireless communication module 220 listens to signals from the servicing base station, measures signal quality, and determines whether it is necessary to switch to another base station. For example, when the wireless communication module 220 has strong reception, for example, signal strength being larger than a threshold, the wireless communication module 220 stay camped on to the servicing base station. However, when the wireless communication module 220 has a weak reception, for example, signal strength being smaller than a threshold, the wireless communication module 220 starts a scan process, such as a partial scan process, a full scan process, and the like, to search for another servicing base station with which a better communication link is available.

The communication controller 230 receives inputs from the G-sensor 210. Based on the inputs from the G-sensor 210, the communication controller 230 determines whether the mobile phone 201 is in an elevator, for example, and controls the operations of the wireless communication module 220, such as a scan process, based on the determination.

In FIG. 2A, during operation, when the wireless communication module 220A has a weak reception, the wireless communication module 220A informs the communication controller 230A of the weak reception.

In response to the weak reception, the communication controller 230A stores the present servicing base station as a last servicing base station in the memory 231A. In addition, in an example, the communication controller 230A sends a signal to activate the G-sensor 210A, and starts to receive inputs from the G-sensor 210A. In an embodiment, the communication controller 230A sends a signal to the wireless communication module 220A to start a scan process to search for another servicing base station. In another embodiment, the wireless communication module 220A automatically starts a scan process to search for another servicing base station.

In FIG. 2B, the G-sensor 210B senses gravitational field and provides gravitational information, such as sensed gravitation values, to the communication controller 230B. Based on the sensed gravitation values, the communication controller 230B detects vertical dynamics and determines whether the mobile phone 201B is in an elevator based on the vertical dynamics. Based on the determination, the communication controller 230B sends control signals to the wireless communication module 220B.

In an embodiment, the communication controller 230B receives sensed gravitation values from the G-sensor 210B. The communication controller 230B compensates the sensed gravitation value to determine a vertical acceleration. Further, in an example, the communication controller 230B integrates the vertical acceleration over time. The integration of vertical acceleration is indicative of a vertical velocity of the mobile phone 201B. In an example, when the absolute value of the integration is larger than the threshold, the communication controller 230 determines that the mobile phone 201B has vertical movement.

Further, in an example, the communication controller 230B integrates the vertical velocity of the mobile phone 201B. The integration of the vertical velocity is indicative of a vertical distance traveled by the mobile phone 201B. In an example, when the absolute value of the integration is larger than a floor height, the communication controller 230 determines that the mobile phone 201B is in an elevator.

According to an aspect of the disclosure, the communication controller 230B keeps track of the vertical acceleration of the mobile phone 201B. In an example, when the vertical acceleration changes sign, for example, from positive to negative, the communication controller 230B determines that the elevator is about to stop. In another example, when the vertical velocity is zero, the communication controller 230B determines that the elevator stops. In another example, when the vertical velocity stays zero for a time duration that is greater than a threshold, the communication controller 230B determines that the elevator stops. It is noted that, in an example, the threshold is configurable. In the case of an elevator, the threshold accommodates, e.g., intermediate stops.

In an embodiment, when the elevator stops, the communication controller 230B sends a signal to the wireless communication module 220B to start a scan process from the last servicing base station to search for a servicing base station.

In another embodiment, when the communication controller 230B determines that the mobile phone 201B is in an elevator, for example, by sensing vertical acceleration/deceleration, or by detecting presence in a Faraday's cage, the communication controller 230B instructs the wireless communication module 220B to monitor received signal strength periodically, such as every 1 ms. When the wireless communication module 220B starts to have strong reception, the communication controller 230B determines that the elevator stops, and instructs the mobile phone 201B to start a scan process from the last servicing base station to start search for a servicing base station.

According to an aspect of the disclosure, an elevator may act as a Faraday's cage to block communication signals in the air. Thus, when a mobile phone enters the elevator, the mobile phone loses reception; and when the mobile phone exits the elevator, the mobile phone regains reception. Then, presence in an elevator can be determined by detecting a Faraday's cage, and/or sensing vertical acceleration.

In the FIG. 2A and FIG. 2B example, when the mobile phone 201 enters the elevator, the mobile phone 201 loses reception, and saves the last servicing base station. When the mobile phone 201 exits the elevator, the mobile phone 201 starts a scan process from the last servicing base station, and quickly re-locks to the last servicing base station to receive wireless communication service from the relocked servicing base station.

In a comparison example, when a comparison mobile phone enters the elevator, the comparison mobile phone loses reception from a present servicing base station, and starts a scan process to search for another servicing base station. Due to the weak reception, the comparison mobile phone may fail a partial scan, and starts a full scan process. When the comparison mobile phone exits the elevator, the comparison mobile phone is in a middle of the partial scan or the full scan. Then, it may take tens of seconds to couple of minutes for the comparison mobile phone to finish the scan process, and re-lock to the last servicing base station. According to another aspect, the searching operations in the elevator waste power, because presence in a Faraday's cage typically precludes receipt of suitable signals.

It is noted that the mobile phone 201 can use inputs from other sensors to detect whether the mobile phone 201 enters or exits an elevator. In an example, the mobile phone 201 uses inputs from an internal radar configured to detect a metal structure that acts as a Faraday's cage to determine whether the mobile phone 201 enters or exits an elevator.

FIG. 3 shows a flow chart outlining a process example 300 for governing communication operations based on a sensed environmental condition according to an embodiment of the disclosure. In an embodiment, the process 300 is executed by the mobile phone 201 in FIG. 2A and FIG. 2B. The process starts at S301 and proceeds to S310.

At S310, the mobile phone 201 receives weak reception. In an example, initially, the mobile phone 201 is camped to a servicing base station for wireless communication service. Periodically, the wireless communication module 220 listens to the servicing base station, and evaluates signal quality received from the servicing base station. When the signal quality is high, for example, the signal strength being larger than a threshold, the wireless communication module 220 remain camped to the servicing base station. However, when the signal quality is lower, for example, the signal strength being lower than a threshold, the wireless communication module 220 has a weak reception to the present servicing base station or even loses reception from the present servicing base station. When the wireless communication module 220 detects the weak reception, the wireless communication module 220 sends a signal to the communication controller 230 to inform the weak reception. In an embodiment, in response to the weak reception, the communication controller 230 stores the present servicing base station as a last servicing base station in the memory 231.

At S320, the communication controller 230 controls the wireless communication module 220 to start a scan process to search for a suitable servicing base station. In an embodiment, the communication controller 230 controls the wireless communication module 220 to start a partial scan process to search for suitable servicing base station according to a list of a subset of base stations. In another embodiment, the communication controller 230 controls the wireless communication module 220 to start a full scan process to search for suitable servicing base station. It is noted that, in an embodiment, the wireless communication module 220 starts the scan process by itself when weak reception is detected.

At S330, the communication controller 230 activates sensors, such as the G-sensor 210, for example. The communication controller 230 starts to receive inputs from the G-sensor 210 and detects vertical dynamics of the mobile phone 201 based on the inputs. In an embodiment, the communication controller 230 sets up a timer for the sensors.

At S340, the communication controller 230 determines whether there is vertical movement. In an example, the communication controller 230 receives a gravitation value from the G-sensor 210. The communication controller 230 compensates for the gravitation value to detect vertical acceleration. Then, the communication controller 230 integrates the vertical acceleration over time to detect vertical velocity. When an absolute value of the vertical velocity is larger than a threshold, the communication controller 230 determines that the mobile phone 201 has vertical movement, and the process proceeds to S350; otherwise, the communication controller 230 determines that the mobile phone 201 does not have vertical movement, and the process proceeds to S399 and terminates.

At S350, the communication controller 230 tracks the vertical movement until a stop is detected. In an embodiment, the communication controller 230 keeps track of the vertical acceleration. When the vertical acceleration changes sign, such as from positive to negative, or from negative to positive, the communication controller 230 detects that the vertical movement is about to stop. In another embodiment, the communication controller 230 keeps track of the vertical velocity. When the vertical velocity is zero, the communication controller 230 detects that the vertical movement stops.

At S360, the communication controller 230 determines whether the vertical movement causes the mobile phone 201 to travel a vertical distance that is larger than a threshold, such as a floor height, and the like. When the vertical distance is larger than the floor height, the process proceeds to S370; otherwise, the process proceeds to S380.

At S370, the communication controller 230 sends a signal to the wireless communication module 220 to restart a scan process from the stored last servicing base station. The process proceeds to S399 and terminates.

At S380, the communication controller 230 determines whether a sensor time-out happens. When the sensor time-out happens, the process proceeds to S399 and terminates; otherwise, the process returns to S340 to detect vertical movement.

It is noted that the process 300 can be suitably modified. In an example, at S370, after the wireless communication module 220 restarts a scan process from the stored last serving base station, the process returns to S340 to detect further vertical movement. In another example, S320 and S330 are executed in parallel or in a different order.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A method for controlling user equipment (UE), comprising:
    sensing an environmental condition using a sensor associated with the UE;
    computing integration of vertical accelerations of a vertical movement of the UE over time based on the sensed environmental condition;
    determining that the UE is in an elevator when an absolute value of the integration is larger than a threshold;
    predicting stopping of a vertical movement of the elevator based on changes in the vertical accelerations; and
    governing a communication functionality of the UE based on the integrated accelerations.

2. The method of claim 1, further comprising:
    sensing a proximity to a human appendage; and
    controlling a radiation characteristic of the UE for communication based on the sensed proximity.

3. The method of claim 2, wherein controlling the radiation characteristic of the UE for communication based on the sensed proximity further comprises at least one of:
    adjusting respective transmission power of multiple antennas to direct transmission away from a human head when the UE is sensed in a proximity of the human head; and
    reducing a radiation power when the UE is sensed in the proximity of the human head.

4. The method of claim 1, wherein sensing the environmental condition further comprises:
    sensing a motion dynamic of the UE.

5. The method of claim 4, wherein governing the communication functionality based on the sensed environmental condition further comprises at least one of:
    governing a receiving algorithm based on the sensed motion dynamic;
    governing a protocol operation of the UE based on the sensed motion dynamic; and
    governing a scan process to search for a servicing base station based on the sensed motion dynamic.

6. The method of claim 1, further comprising:
    storing a last servicing base station when the UE loses reception from the last servicing base station; and
    re-establishing a communication service with the last servicing base station based on the sensed environmental condition.

7. The method of claim 6, wherein sensing the environmental condition using the sensor associated with the UE further comprises:
    sensing an elevation dynamic of the UE using a gravimeter.

8. The method of claim 7, wherein:
    storing the last servicing base station when the sensed elevation dynamic is indicative of the UE being in an elevator.

9. The method of claim 7, further comprising:
    activating the gravimeter when the UE loses reception from the last servicing base station.

10. The method of claim 7, wherein re-establishing the communication service with the last servicing base station based on the senses environmental condition further comprises at least one of:
    re-establishing the communication service with the last servicing base station when the sensed elevation dynamic is indicative of the UE being out of the elevator; and
    re-establishing the communication service with the last servicing base station when received signal strength exceeds a threshold.

11. User equipment (UE), comprising:
    an environmental sensor module configured to sense an environmental condition of the UE;
    a wireless communication module configured to perform wireless communication; and
    a communication controller configured to compute integration of vertical accelerations of a vertical movement of the UE over time based on the sensed environmental condition input from the environmental sensor module, determine that the UE is in an elevator when an absolute value of the integration is larger than a threshold, predict stopping of a vertical movement of the elevator based on changes in the vertical accelerations, and govern operations of the wireless communication module based on the integrated accelerations.

12. The UE of claim 11, wherein the environmental sensor module comprises at least one of a gravimeter configured to sense a gravitational field, a Gyro-sensor configured to gather rotation information, a compass configured to sense a magnetic field, a global positioning system (GPS) configured to sense a location and a speed, a humidity sensor configured to sense a humidity, a surrounding temperature sensor configured to sense an external temperature, a barometric sensor configured to sense a pressure and an altitude, and a metal sensor configured to sense surrounding metal.

13. The UE of claim 11, wherein
    the environmental sensor module is configured to sense a proximity to a human appendage; and
    the communication controller is configured to control an emitted radiation characteristic based on the sensed proximity.

14. The UE of claim 13, wherein
    the wireless communication module comprises multiple antennas; and
    the communication controller is configured to adjust respective transmission power of the multiple antennas to collectively direct the transmission away from a human head when the UE is sensed in a proximity of the human head.

15. The UE of claim 13, wherein
the wireless communication module comprises a power amplifier configured to adjust a transmission power; and
the communication controller is configured to control the power amplifier to reduce the transmission power when the UE is sensed in a proximity of a human head.

16. The UE of claim 11, wherein the communication controller is configured to govern at least one of a scan operation to search for a servicing base station, a selection of a coding class, a scheduling of power mode, a changing of radio access technology (RAT), and a selection of radiation characteristics.

17. The UE of claim 11, wherein:
the environmental sensor module comprises a gravimeter configured to sense an elevation condition; and
the communication controller comprises a memory configured to store a last servicing base station when the UE loses reception from the last servicing base station.

18. The UE of claim 17, wherein:
the communication controller is configured to re-establish a communication service with the last servicing base station when the elevation condition is indicative of the UE being out of an elevator.

19. The UE of claim 17, wherein:
the communication controller is configured to re-establish a communication service with the last servicing base station when a signal strength is larger than a threshold.

20. The UE of claim 11, wherein:
the wireless communication module comprises a protocol stack configured to provide communication services; and
the communication controller is configured to govern operations of the protocol stack based on the sensed environmental condition.

* * * * *